United States Patent [19]

Megy

[11] Patent Number: 4,943,419
[45] Date of Patent: Jul. 24, 1990

[54] PROCESS FOR RECOVERING ALKALI METAL TITANIUM FLUORIDE SALTS FROM TITANIUM PICKLE ACID BATHS

[76] Inventor: Joseph A. Megy, 3740 Chinquapin, Corvallis, Oreg. 97220

[21] Appl. No.: 331,583

[22] Filed: Mar. 30, 1989

Related U.S. Application Data

[63] Continuation-in-part of Ser. No. 198,159, May 24, 1988, abandoned.

[51] Int. Cl.$^5$ .............................................. C01G 23/02
[52] U.S. Cl. ...................................... 423/72; 423/464
[58] Field of Search ........................ 423/72, 82, 84, 85, 423/464, DIG. 1, DIG. 2

[56] References Cited

U.S. PATENT DOCUMENTS

| | | | |
|---|---|---|---|
| 2,500,792 | 3/1950 | Blythe et al. | 423/72 |
| 2,568,341 | 9/1951 | Kawecki et al. | 423/72 |
| 2,717,197 | 9/1955 | Brown et al. | 423/464 |
| 3,666,580 | 5/1972 | Kreml et al. | 156/642 |
| 4,105,469 | 8/1978 | Megy et al. | 134/3 |
| 4,330,342 | 5/1982 | Fennemann et al. | 423/72 |
| 4,497,779 | 2/1985 | Kramer et al. | 423/72 |

FOREIGN PATENT DOCUMENTS

| | | | |
|---|---|---|---|
| 706326 | 12/1979 | U.S.S.R. | 156/642 |
| 819062 | 4/1981 | U.S.S.R. | 423/464 |

*Primary Examiner*—John Doll
*Assistant Examiner*—Wayne A. Langel
*Attorney, Agent, or Firm*—Harness, Dickey & Pierce

[57] ABSTRACT

A process for recovering alkali titanium fluoride salts suitable for commercial use from spent pickle acid liquors containing titanium by adjusting the fluoride to titanium mole ratio to critical ranges, adding an excess of alkali metal salt, and gently agitating the resulting solution at a temperature of at least 22° C. to crystallize out the alkali metal titanium fluoride salt. The resulting filtrate can be neutralized with lime to yield a much reduced quantity of environmentally safe solid wastes compared with current neutralization practices where a titanium salt is not first recovered. (Optionally, in some cases, the filtrate can be recycled back to the acid pickling operation.) The liquid waste from filtering the neutral solids is low in metals and fluorides and generally acceptable for discharge to public treatment systems.

59 Claims, 1 Drawing Sheet

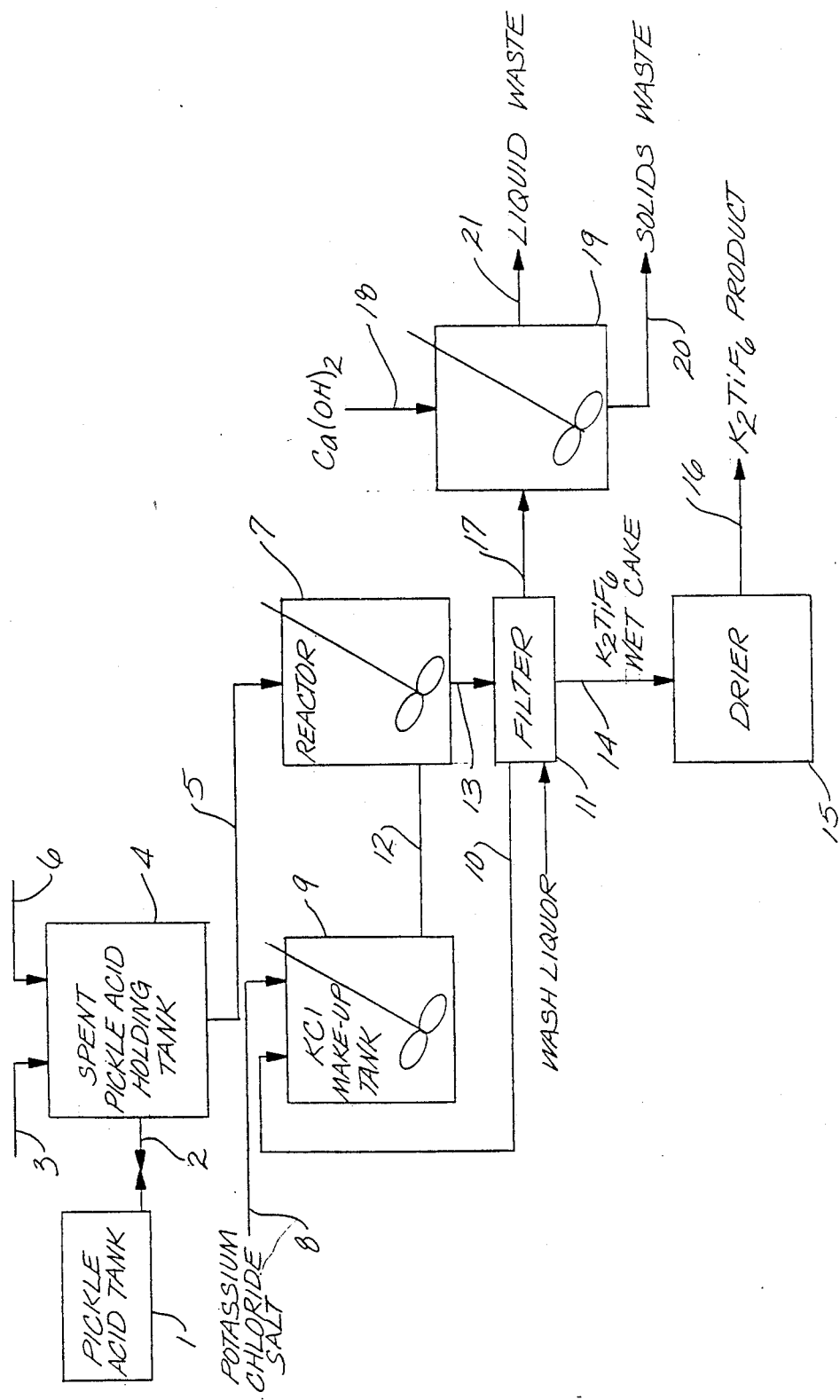

PROCESS FOR RECOVERING ALKALI METAL TITANIUM FLUORIDE SALTS FROM TITANIUM PICKLE ACID BATHS

RELATED CASES

This is a continuation-in-part application of my U.S. patent application Ser. No. 07/198,159 filed May 24, 1988, abandoned.

FIELD OF THE INVENTION

The instant invention relates to a process for recovering alkali metal titanium fluoride salts (hereinafter referred to as "fluoride salts") with purity and physical properties suitable for commercial use from spent titanium pickle acid liquors. The invention further relates to an economical process for treating spent pickle acid liquors to render them more amenable for the disposal in the environment. The method comprises the steps of adding alkali metal salts and fluoride ions in carefully controlled ratios, at suitable temperatures and operating conditions to crystallize a commercially usable fluoride salt, followed by treatment of the processed pickle acid liquor with a base to produce a low fluoride liquid effluent and, compared with current lime neutralization practices, a much reduced quantity of solid waste which is amenable to disposal in a landfill. Compared with certain caustic neutralization practices, the process yields a low fluoride effluent and both a reduced quantity of solids and solids essentially free of objectionable soluble fluorides and vanadium.

BACKGROUND OF THE INVENTION

Titanium metals and alloys are produced commercially as ingots, and then processed to finish parts by various forging, rolling, extrusion and machining operations. Some titanium metal parts are formed by casting molten titanium metal or alloys. For many of the operations, the titanium metals or alloys are heated to allow forming the metals with less force and to allow greater deformation of the material without cracking. Each time titanium metal or alloy is heated in air, it reacts with the oxygen therein to form a titanium oxide coating which is then removed prior to further fabrication of the metal. The oxide coating is removed by sand blasting, bead blasting, or abrasive techniques followed by acid pickling the metal to chemically removed small amounts of the titanium metal from the surface. Many titanium metal parts, particularly castings, are chemically milled to final dimensional tolerances by pickling or chemical milling in pickle acid baths.

The pickling operation consists of placing the titanium metal or alloy in a bath of hydrofluoric acid and water to yield a titanium metal fluoride (TiF$_4$ or TiF$_3$). The chemical reactions which occur are depending on availability of HF (the second reaction (II) also depends upon nitric acid or other oxidant being present in the bath):

$$Ti + 3HF \rightarrow TiF_3 + 3/2 H_2 \qquad (I)$$

$$TiF_3 + F \rightarrow TiF_4 \qquad (II)$$

A typical pickling acid bath contains 2 to 7 weight-percent hydrofluoric acid. The rate of pickling is enhanced by adding a strong mineral acid to the bath. Both sulfuric and nitric acids are commonly used, typically at a concentration of between 5 and 35 weight-percent. Nitric acid has the additional advantage that it inhibits the absorption of hydrogen into the titanium metal or alloy during the pickling operations and, therefore, is the most commonly used mineral acid additive. The mineral acid also aids in the dissolution of some of the alloying ingredients in the titanium metal or alloy and in oxidizing trivalent titanium to tetravalent titanium in the pickle acid bath. To increase the bath life of the pickle acid bath, additional hydrofluoric and mineral acid are typically added periodically. The hydrofluoric acid reacts with the titanium to form a titanium metal fluoride. When the pickle acid becomes saturated with the titanium fluoride at about 65-80 grams of titanium per liter, depending on the pickle acid temperature, oxidation state of the titanium, or acid concentration, an impurity concentration, the acid bath is "spent". At this point the pickling reaction is greatly retarded and hydrous titanium fluoride solids coat the titanium metal or alloy being pickled, making further pickling unsatisfactory.

The spent titanium pickle acid contains titanium fluoride, mineral acid (typically nitric acid), sometimes excess hydrofluoric acid, and various dissolved alloying ingredients (usually vanadium and aluminum from the commonly processed 90% Ti-6% V-4% Al alloy).

My U.S. Pat. No. 4,105,469 teaches a process for treating spent pickle acid from zirconium pickling such that the zirconium fluoride salts are recovered and the pickle acid is regenerated for additional pickling. Fennemann (U.S. Pat. No. 4,330,342) improved this process by showing NaOH and extra HF could be used to recycle the spent zirconium pickle acid. During our research into various spent pickle acid systems we have found that various metal salts such as NaHCO$_3$, Na$_2$CO$_3$, NaHF, and NaNO$_3$ can be used replacing NaF and NaOH as taught in these patents together with added hydrofluoric acid. These raw materials (particularly Na$_2$CO$_3$) further reduce the cost of the process and allow for tighter process control as taught by Fennemann.

Any attempt to recycle titanium pickle acid solutions is limited by the large amounts of alloying ingredients commonly in titanium alloys which rapidly build up in recycle systems to render the pickle acid unusable.

Commercial attempts to recycle titanium pickle acid mixtures using a process similar to that taught in U.S. Pat. No. 4,105,469, but substituting KF for NaF fail in pickle acid systems which pickle titanium alloys due to the rapid buildup of impurity components in the recycled pickle acid, and impurities in the product salt. Even when one attempts to recover fluoride salts without attempting to recycle the pickle acid, the salt produced has high levels of impurities and fine particle size unless processed according to the teachings herein.

There are instances, however, where chemically pure ("CP") titanium is pickled. In this case, where no alloying metals are present, it is practical to adjust the spent titanium pickle acid with HF or AHF$_2$ (where A is an Alkali metal) and treat with alkali metal salts in accordance with the procedures described herein and recover a relatively pure alkali metal titanium fluoride, A$_2$TiF$_6$. Under these circumstances, and as long as there are sufficient losses and/or intentional bleed off to prevent the buildup to the point of significant precipitation with the A$_2$TiF$_6$ of impurities such as Ca, Mg, Fe, and Si, the processed acid can be fortified with fresh HF and HNO$_3$ and recycled back to the pickle bath. In this process reagent and temperature control of the crystallization process is important to avoid precipitation of fluoride salts in the regenerated pickle bath.

At the present time most spent pickle acid liquors are neutralized with caustic soda or lime and discarded. When spent titanium pickle acid liquors are neutralized with caustic, large amounts of solids which contain sodium, titanium, fluorine, and hydroxide approximately consistent with the stoichiometry of $Na_2Ti(OH)_2F_4$, are formed together with complexed solids of the alloying ingredients. These solids are commonly disposed of in landfills, but are objectionable due to the solubility of the fluorine ion in these solids. The liquid from the caustic neutralization also contains considerable fluoride ion which is objectionable in many liquid disposal options. An obvious option would be to use lime to neutralize the pickle liquor and fix the fluoride ion in the generated solids. Unfortunately, liming the pickle liquor gives a larger volume of solids which are difficult to filter.

SUMMARY OF THE INVENTION

One objective of the present invention is to produce from spent pickle liquors a liquid effluent which is more environmentally acceptable.

Another objective of the present invention is to produce from spent pickle liquors a solid effluent which is more environmentally acceptable.

Another objective is to reduce the quantity of solid effluent.

Another objective of the present invention is to recover the valuable titanium fluoride values as a product of high purity and commercially acceptable particle size, from spent pickle acid.

Another objective of the present invention is to produce a saleable by-product from the spent pickle liquor.

Another objective of the present invention is to carry out the other objectives employing inexpensive alkali metal salts, especially alkali metal chloride salts.

Another objective of the present invention is to neutralize the spent pickle liquor with minimal expense.

These and other advantages of the present invention will be apparent in the following description and drawing.

BRIEF DESCRIPTION OF THE DRAWING

The sole FIGURE of the Drawing represents a flow diagram of the process according to the present invention.

In accordance with the above objectives, it has been found that titanium fluoride salts suitable for use in the aluminum master alloy industry and other commercial applications can be removed from spent titanium pickle liquors to a low residual level by reaction with potassium and other alkali salts, provided that the fluoride concentration is adjusted to give a specific ratio of fluoride ion to titanium ion, under certain temperature and operating conditions. Unexpectedly, potassium and other alkali ions can be added as any one of a large group of salts, oxides or hydroxides including nitrate, chloride, sulfate, carbonate, bicarbonate, bifluoride, oxide, or hydroxide salts, in addition to the alkali metal fluoride salts. The chloride salt (e.g., potassium chloride) is the cheapest raw material and is entirely satisfactory. The desired potassium fluoride salt precipitate is potassium titanium fluoride (i.e., $K_2TiF_6$), although other products are possible, including $KTiF_5 \cdot H_2O$ and $K_3TiF_7$. These salts are formed particularly when limited amounts of mineral acid are present in the spent pickle liquor.

Potassium titanium fluoride ($K_2TiF_6$) has a commercial use as a raw material in preparing aluminum-titanium master alloys. To be attractive to this market, however, the fluoride salts must be of high purity and a specific particle size. The commercial requirements call for a $K_2TiF_6$ product with a minimum of 19.5% Ti content with a particle size generally between 60 and 325 mesh. Undesirable contaminants include calcium, iron, silicon and magnesium.

The process can also be used to produce $Na_2TiF_6$ by substituting an appropriate sodium salt for the potassium salt. $Na_2TiF_6$ can be used for the manufacture of pure titanium metal as described in U.S. Pat. No. 4,390,365.

In order to achieve the desired purity and particle size distribution, it is necessary to control the fluoride ion concentration, the titanium valent state, temperature, and crystallization conditions as described below. When $A_2TiF_6$ (wherein A is an alkali metal) is crystallized from the spent pickle liquor, many ions frequently present in the pickle acid liquor stay in solution. These include iron, chromium, niobium, tin, nickel, vanadium, chloride and nitrate ions. Under some conditions, calcium, silicon, and aluminum ions contaminate the product if present in the pickle liquor. Silicon is a common impurity in hydrofluoric acid used in pickling operation and in some alkali salts. The silicon precipitates with $A_2TiF_6$ salts and contaminates them. Therefore, to obtain a quality $A_2TiF_6$ product with regard to silicon impurity, it is necessary to control the raw materials in the pickle acid system to eliminate silicon impurities.

Aluminum is a common alloying constituent of titanium alloys and will contaminate the $A_2TiF_6$ unless the fluoride level in the pickle acid is controlled. When pickling titanium, it is economical to consume most of the free hydrofluoric acid from the bath at the approximate point when the bath is saturated with titanium fluoride. In some critical chemical milling operations, the pickle acid is only loaded with titanium fluoride to partial-saturation to maintain milling performance. This gives a spent pickle acid containing perhaps six moles of fluorine per mole of titanium. The mole ratio of fluorine to titanium in the spent pickle liquor when it is discarded by the pickler therefore may range from about 3.0 to about 6.0.

The production of $A_2TiF_6$ also requires the titanium in the spent pickle acid is in the tetravalent state. When excess nitric acid is used in the pickling process and the pickle acid can be processed directly. If trivalent titanium is present in the bath as evidence by a black (dark purple) color, then an oxidant (e.g. nitric acid preferred) must be added before processing. Other oxidants which are strong enough to oxidize trivalent titanium to tetravalent titanium can also be used, e.g. peroxide, perchlorate and hypochlorite.

Hydrofluoric acid sufficient to give a combined total of at least about 5.5 moles of fluorine acid per mole of titanium is then added to the spent pickle acid. If the spent titanium pickle liquor contains aluminum and/or calcium, and if fine crystals are desired, the fluorine to titanium mole ratio is preferably adjusted to a value of from about 5.5 to about 6.2, most preferably from about 5.9 to about 6.2. Fine crystals of $A_2TiF_6$ are not commonly used in existing commercial applications. As fluoride to titanium ratio is reduced below 6.2, the yield of $K_2TiF_6$ is progressively reduced.

These fine $K_2TiF_6$ crystals (which typically form with 98% less than 325 mesh) when washed free of the processed spent pickle acid mother liquor with water, and held without drying in wash for a period of hours, coarsen considerably, commonly reaching 95% greater than 325 mesh. The rate of growth can be enhanced by adding a small amount of hydrofluoric acid (e.g. about one-half weight percent) to the wash water. Coarse crystals made by this two step process are very pure, but are formed with less yield and more processing costs than those described below.

Large crystals can be formed directly, by adjusting the fluorine to titanium mole ratio to give a small excess of fluorine, such as a ratio of about 6.3 to about 6.8, with very low aluminum and/or calcium contamination. Preferably the fluorine to titanium mole ratio is adjusted to about 6.4. The exact excess of fluoride ion before contamination becomes objectionable depends on the amount of impurities present in the spent pickle acid and the titanium concentration in the pickle acid solution. $K_2TiF_6$ made in this fluoride to titanium mole ratio (about 6.3 to about 6.8) are generally suitable for commercial purposes if other operating conditions are appropriate as specified below. If high fluoride to titanium molar ratios are used, (e.g., 7.3) calcium and aluminum impurities precipitate with the $K_2TiF_6$ crystals making the crystals generally unsuitable for commercial use.

Alkali metal salt can then be added to the fluorine adjusted spent pickle acid to precipitate $A_2TiF_6$ crystals. For control of the aluminum impurity level in the $A_2TiF_6$, the exact mole ratio of fluorine to titanium was found to be critical. The present process requires that fluoride ion, usually as hydrofluoric acid, be added to adjust the fluorine to titanium mole ratio in the spent pickle acid from about 6.3 to about 6.8 to crystallize the $A_2TiF_6$ (a) without contamination from aluminum salts and (b) of a reasonable particle size. If more fluoride ion is added, such that the fluorine to titanium mole ratio is greater than about 6.8 in the spent pickle acid liquor, there is an increasing amount of aluminum precipitated with the $A_2TiF_6$ product. If, however, less than about 6.2 moles of fluorine per mole of titanium is present in the spent pickle acid solution, the titanium yield to $A_2TiF_6$ is reduced proportionately and small crystals are formed as discussed above. Therefore to obtain optimum yields of pure $A_2TiF_6$ from aluminum containing pickle acid baths, the mole ratio of fluorine to titanium must be accurately controlled. Control of the fluorine to titanium mole ratio to about 6.3 to about 6.8 (depending on the alloy concentration in the spent pickle acid liquor), also reduces the contamination of $A_2TiF_6$ with respect to calcium in an analogous manner to aluminum. Unlike aluminum, calcium can also be controlled by avoiding the use of raw materials containing calcium in the pickle acid system whereas aluminum is a common alloying ingredient in titanium and usually can not be avoided.

The control of fluorine to titanium mole ratio of slightly less than about 6.2 has a decisive effect on the particle size of the $A_2TiF_6$ product. With slightly deficient fluoride ion, e.g., a fluorine to titanium mole ratio below about 6.2 (depending on the alloy concentrations in the spent pickle acid liquor), the particle size is fine, and the bulk density of the dried $A_2TiF_6$ is reduced. Although a larger filter and dryer are required to filter, wash and dry the crystals, this fine crystal product may be desired. If, on the other hand, excess fluorine to titanium mole ratio is used, the $A_2TiF_6$ forms as large crystals with significantly less moisture in the filter cake and a higher bulk density in the finished product.

The alkali salt can be added in a dissolved form to the pickle acid solution. If the alkali salt used in the process is a neutral salt (e.g., alkali metal chloride, nitrate, sulfate, etc.), it is convenient to recycle wash water used to wash the $A_2TiF_6$ product for this purpose. If the alkali metal compound is a base or oxide (e.g., alkali metal carbonate, bicarbonate, hydroxide, etc.), it is convenient to neutralize it by dissolving it in to acidic processed pickle acid effluent from the process prior to adding it to the pickle acid.

The granular alkali salt can also be added directly to the crystallizer without dissolution. In both cases the addition is made slowly with sufficient agitation to rapidly distribute the alkali salt and to suspend the product salt, to promote growth of large size crystals.

The dissolved alkali metal compound and the spent pickle liquor (after adjustment of the fluorine to titanium mole ratio) can be added simultaneously to the crystallizer operated in either a batch or continuous mode. This practice maintains the crystallizer near equilibrium conditions and results in $A_2TiF_6$ with a larger particle size. However, satisfactory $A_2TiF_6$ product can be made in the batch mode with good crystallization practice. Adding the alkali salt solution through a distributor positioned directly under an agitator in the reactor containing the pickle acid solution over a period of about one hour results in a satisfactory product. Alternatively, dry crystals can be slowly added to the surface of the crystallizer with sufficient mixing to disperse the solids upon contact. The agitator is designed to suspend all of the $A_2TiF_6$ crystals, but is large and relatively slow moving to avoid unnecessary attrition of the crystals.

To form acceptable product crystals in high-yield, temperature control of the crystallization process is critical. For preparation of a $K_2TiF_6$ product, the temperature of the crystallizer must be greater than about 22° C. Below that temperature there is formed $K_2TiF_6 \cdot H_2O$, which is very difficult to filter and is not useful for producing an aluminum master alloy. In practice, a crystallization temperature of from 26° C. to 28° C. is found to give good crystals free of $K_2TiF_6 \cdot H_2O$. If the crystallization temperature is higher than 28° C., however, the solubility of the fluoride salt product is increased, thereby reducing yields. Control of the temperature for crystallization is affected by several process considerations.

Under normal pickling operations, the spent pickle acid is discharged at above ambient temperature, as the pickling of titanium metal and alloys is exothermic. In addition, adjustment of the fluorine to titanium ratio by addition of hydrofluoric acid is exothermic. The result is that the spent pickle acid is frequently hotter than the desired crystallization temperature. It can be cooled (a) simply by storing it in a holding tank (b) heat exchanging using an acid-resistant heat exchanger, or (c) by sparging it with air. If the spent pickle acid is too cold, it can be brought up to crystallization temperature with live steam or with a heat exchanger.

Many neutral acid salts dissolve endothermically in water. It is frequently necessary to heat the water used to dissolve the alkali metal salt and to raise the salt solution to the desired crystallization temperature if the salt is added as a solution.

The heat of the crystallization reaction itself is typically small and positive and it results in raising the temperature of the crystallizer slurry a couple of degrees Centigrade during the crystallization step. If the alkali salt is added to the crystallizer as a solid the two heat effects nearly balance and the crystallizer temperature is not greatly affected.

The $A_2TiF_6$ crystals of the present process are easy to filter using standard methods such as a plate-and-frame filter or a continuous-belt filter. To obtain high-purity crystals, the crystals must be washed to remove the processed spent mother liquor which contains the impurities which are rejected from the crystals during the crystallization step. Pure water is suitable as a wash liquor. The wash filtrate is advantageously used for recycle to dissolve the alkali salt addition as discussed above if the alkali salt is added as a solution.

The processed spent mother liquor filtrate typically contains from 1.5 to 5 grams per liter titanium and from 8.0 to 20 grams per liter fluoride ion, depending on the excess alkali salt used in the crystallization reaction, the temperature of the final slurry, and the fluoride to titanium ratio in the spent pickle acid solution after adjustment of fluoride concentration.

The instant invention teaches that the pH of this liquor can be adjusted with lime to precipitate a solid which can be filtered and which contains essentially all of the titanium, aluminum, vanadium, niobium, other alloying agents and fluoride left in the processed pickle acid solution but generates much less solids than if the spent pickle acid is neutralized directly. The calcium content of the solids maintains the fluoride in a relatively unleachable form, and such solids can typically be disposed of in landfills. Since most of the titanium and fluoride has been removed from the processed spent titanium pickle acid liquor the amount of solids formed is greatly minimized as compared to direct neutralization of spent titanium pickle acid liquor.

The lime-treated, processed spent mother liquor has low levels of fluoride and metal ions and is typically environmentally suitable for discharge in public waters.

If the spent pickle acid is treated directly with lime without first removing most of the titanium and fluorine from the solution, more lime is used and much greater quantities of solids are generated and the form of the solids is such that it is less-easily filtered or settled. The actual reduction in lime usage and solids generated depends upon the concentration of the titanium and fluorine in the spent pickle liquor. But as an example, the wet solids generated from directly neutralizing spent pickle acid from pickling the titanium alloys containing 46.4 gpl (grams per liter) titanium and 82.5 gpl fluorine amounted to 8.04 lbs. per gallon of spent acid whereas after processing according to this invention, the wet solids amounted to only 2.75 lbs. per gallon of spent acid for a three fold reduction in solid waste.

The amount of lime required to neutralize the acid directly was 2.64 lbs. per gallon of spent pickle acid whereas the amount of lime required to neutralize the acid after it was treated according to this invention was equivalent to 1.55 lbs. per gallon of spent pickle acid for a reduction of more than 40%. Magnesium oxide or hydroxide, and dolimite limes can also be used for neutralization.

DETAILED DESCRIPTION OF THE INVENTION

The potassium hexafluorotitanate salt ($K_2TiF_6$) is significantly less soluble than sodium hexafluorotitanate salt ($Na_2TiF_6$) in aqueous solutions, thereby allowing a higher yield if this salt is produced. In addition, the potassium fluorotitanate salt forms better crystals and is the fluoride salt of choice for making aluminum master alloy. For these reasons, $K_2TiF_6$ is the preferred titanium fluoride salt product. The cheapest potassium salt is potassium chloride, which is considerably cheaper than potassium nitrate, sulfate, carbonate, bicarbonate, or hydroxide. The disadvantage of using potassium chloride is that the chloride ion will be discharged in the final liquid effluent from the process, which may limit disposal options in some circumstances. Another option sometimes available, is to use potassium carbonate, bicarbonate, hydroxide, or nitrate to yield a final liquid effluent containing potassium, calcium, and nitrate ions. Such an effluent can be used in some liquid fertilizer applications. Potassium fluoride and potassium bifluoride, although relatively expensive, can be used. In these cases, the fluorine adjustment as well as the source of potassium is provided. The hydroxide, carbonate, bicarbonate, nitrate, fluoride and bifluoride can also be used with spent pickle acid from pickling pure titanium in a recycle configuration as mentioned above.

However, the preferred option, on an economic basis, is to produce $K_2TiF_6$ salt using KCl as the alkali metal salt. In this option, the spent pickle acid is placed in an agitated reactor constructed of acid-resistant materials, such as plastic or rubber-lined steel and nitric acid (or other oxidant) added if trivalent titanium is present. The concentrations of titanium and fluoride ions are accurately determined, and hydrofluoric acid is added such that the fluoride to titanium mole ratio in the spent pickle acid is from about 6.3 to about 6.8 (depending on the concentration of alloy components in the bath and the size of crystals desired). If "G" is the gallons of spent pickle acid, "[Ti]" is the titanium concentration in grams per liter in the spent pickle acid, and "[F]" is the fluoride concentration in grams per liter in the spent pickle acid, then the appropriate amount, in pounds, of 70 weight percent hydrofluoric acid solution to add to the spent pickle acid is:

$$70\% \text{ HF (lbs)} = G([Ti] \times 0.0319 - [F] \times 0.01255)$$

When the hydrofluoric acid is added to a typical spent pickle acid solution with 60 grams per liter of titanium, a temperature rise of up to about 15° is obtained, depending on the amount of excess hydrofluoric acid already in the spent pickle liquor.

It is economically advantageous to add an excess of potassium chloride to the crystallizer to lower the residual solubility of the $K_2TiF_6$ by the potassium common ion effect:

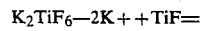
$$K_2TiF_6 - 2K^+ + TiF^=$$

Excess potassium ion drives the reaction to the left. If an excess of about 18 grams per liter of potassium chloride is to be used, then the appropriate amount of granular potassium chloride to be added, in pounds of KCL and at 25° C., is:

$$KCL(lbs) = G([Ti] \times 0.0263 + 0.2895)$$

"G" and "[Ti]" are as defined above.

The KCl is preferably added directly to the prepared spent pickle acid solution as crystals over a period of about one hour. This is conveniently accomplished with a hopper and auger system. The crystals are added to the surface of the crystallizer solution at a position sufficiently turbulent to disperse the KCl crystals into solution upon contact.

Larger crystal size is obtained if $K_2TiF_6$ seed crystals are added prior to the addition of KCl to provide surface area for crystal growth.

The $K_2TiF_6$ crystals which form filter easily. The wet filter cake has a residual moisture of from about 10% to about 30%, depending on crystallizer operating parameters. The cake is washed with about three displacements of water to remove the processed spent pickle acid from the cake.

The filtrate (processed spent pickle acid liquor) is contacted with slaked lime to neutral pH in an agitated tank. The formed solids are removed by a filter and are disposed of to a landfill. The neutralized liquor is discharged to the public waters or other liquid water treatment systems.

The wet crystals can advantageously be stored over night for "aging". Aging grows and refines the particle size of the $K_2TiF_6$ crystals and reduces the impurities which were present in the spent titanium pickle acid liquor. After aging, the crystals are again washed and then dried, screened and ground to achieve the desired sizing, and packaged for sale.

As shown in the drawing, a titanium spent pickle acid 2 containing titanium and fluoride ion is charged from a pickle acid tank 1 to a spent pickle acid holding tank 4. The spent pickle acid is analyzed for titanium and fluorine, and the appropriate amount of hydrofluoric acid 3 is added to the spent pickle acid holding tank 4 to give a fluorine to titanium mole ratio of about 6.3 to about 6.8, preferably 6.4, and additional nitric acid 6 is added to oxidize trivalent titanium if present. Air sparging (not shown) is used to agitate and mix the hydrofluoric acid and the spent pickle acid liquor, and to cool the spent pickle acid liquor as required. The prepared spent pickle acid 5 is discharged to a reactor 7. Potassium chloride salt 8 is added to an agitated KCl make-up tank 9 where it is dissolved in wash filtrate 10 from filter 11. The dissolved potassium chloride solution 12 is added to the reactor 7 through a distributor (not shown) below the reactor agitator. Reactor product slurry 13 from the reactor is filtered at filter 11. The $K_2TiF_6$ wet cake 14 recovered on the filter is washed, aged overnight, rewashed, and then dried in a dryer 15 to yield $K_2TiF_6$ product 16. Processed spent pickle acid liquor 17 from filter 11 is neutralized with slaked lime 18 in an agitated neutralization tank 19. Solid wastes 20 formed in the neutralization tank area are removed by filtration, and the remaining neutralizied liquid waste 21 is discharged to public waters. The solid wastes are suitable for landfill.

EXAMPLE 1

Fifteen hundred (1500) ml of spent titanium pickle acid containing 51.8 grams per liter titanium, 70.6 grams per liter fluoride, 1.6 grams per liter aluminum, and 1.4 grams per liter vanadium were added to an agitated, baffled laboratory crystallization reactor. An addition of 182.9 ml of 49 weight percent hydrofluoric acid was added to the spent pickle acid liquor to give a fluoride to titanium mole ratio in the prepared spent pickle acid liquor of 6.73. Potassium chloride (254.2 grams) was bulked to 1400 ml with water at 40° C. The temperature of the resulting potassium chloride solution was 26° C.

The potassium chloride solution was added at 19.5 ml per minute to a distributor positioned directly below the agitator in the crystallization reactor. The temperature of the reactor solution during the crystallization was 37° C. Following the addition of the potassium chloride solution, the resulting slurry was slowly stirred for an additional 30 minutes and then filtered in a plastic Buchner funnel with polypropylene filter cloth. A $K_2TiF_6$ wet cake weighing 412.4 grams was obtained. The wet cake was washed with 500 ml of water, leaving 326.4 grams of wet cake having 17% moisture. The wet cake was dried to give 294.3 grams of dried $K_2TiF_6$ product solids. The dried $K_2TiF_6$ product had a bulk density of 67 pounds per cubic foot and a particle size distribution which was 90% by weight minus 325 mesh.

One hundred (100) ml of the processed spent mother liquor was neutralized with 55.5 ml of a slurry of 25 grams of hydrated lime in 75 ml of water. The generated waste solids, which weighed 24.8 grams wet and 13.14 grams dry, were vacuum filtered from the waste filtrate on a Buchner funnel. The various process streams were analyzed, as shown in Table I.

In a seperate test, 100 ml of the same original spent pickle acid solution was neutralized with 105 ml of a solution of 50 grams of slaked lime in 150 ml of water. In this case, 103.9 grams of wet waste solids were obtained by filtering on a Buchner filter which gave 46.3 grams of dry waste solids.

In this experiment, a fluoride to titanium mole ratio of somewhat greater than 6.6 was used, which was responsible for the contamination of the $K_2TiF_6$ product with aluminum and calcium. Although the amount of solids generated in the neutralization step was much less than when the pickle acid was neutralized directly, it would have been even less if excess fluoride had not been used. The titanium level in the processed spent pickle acid would have been lower if a greater excess of potassium chloride had been used and if the crystallization temperature had been lower than 37° C.

TABLE I

|    | Processed Spent Pickle Acid | Wash Filtrate | $K_2TiF_6$ Product | Lime Filtrate | Waste Solids |
|----|------|------|------|------|------|
| Zr | 30 ppm | 30 ppm | 10 ppm | — | — |
| Ti | 6.0 g/l | 3.3 g/l | 19.5% | 5 ppm | 23.7% |
| F  | 31.2 g/l | 11.4 g/l | 45.6% | 0.02% | 23.7% |
| K  | 8.1 g/l | 5.1 g/l | 32.2% | 66 g/l | 1.5% |
| Fe | 60 ppm | 30 ppm | 20 ppm | 5 ppm | 0.2% |
| Cr | — | — | — | 10 ppm | 90 ppm |
| Ni | — | — | — | 10 ppm | 0.02% |
| Sn | — | — | — | 50 ppm | 50 ppm |
| Si | 600 ppm | 450 ppm | 630 ppm | 5 ppm | 0.7% |
| Al | 0.42 g/l | 0.03 g/l | 0.23% | 10 ppm | 0.47% |
| V  | 0.69 g/l | 0.15 g/l | 0.32% | 5 ppm | 0.62% |
| Ca | 90 ppm | 30 ppm | 880 ppm | 20.2 ppm | 51.4% |
| Mg | 30 ppm | 30 ppm | 10 ppm | — | 0.29% |

EXAMPLE 2

Several other lab tests were run similar to Example I, except the the amount of KCl added, the fluoride to titanium ratio in the prepared spent pickle acid, and the temperature were varied. In some of these runs, there was used spent pickle liquor from pickling Ti-6-4 which had relatively higher concentrations of aluminum and vanadium than Example I. The data from these runs are summarized in Table II.

TABLE II

| Run No. | (F/Ti)M | (K/Ti)M | Analysis of Processed Pickle Acid Liquor | | | Temp. of Crys. | Impurities in $K_2TiF_6$ | |
|---|---|---|---|---|---|---|---|---|
| | | | K | F | Ti | | Al | Ca |
| 17 | 7.86 | 2.10 | 7.8 g/l | 41.1 g/l | 5.4 g/l | 31° C. | 0.36% | 800 ppm |
| 6 | 6.0 | 2.05 | 8.2 g/l | 28.6 g/l | 5.7 g/l | 26° C. | 450 ppm | 200 ppm |
| 6a | 6.0 | 2.85 | 17.5 g/l | 19 g/l | 2.6 g/l | 26° C. | 0.45% | 450 ppm |
| 30 | 5.47 | 2.19 | 10.5 g/l | 12.9 g/l | 3.0 g/l | 28° C. | 350 ppm | 100 ppm |
| 24 | 6.16 | 2.17 | 11.7 g/l | 13.89 g/l | 4.2 g/l | 28° C. | 0.32% | 100 ppm |
| 22 | 7.02 | 2.22 | — | — | — | 25° C. | 1.1% | 50 ppm |
| 23 | 6.87 | 2.17 | — | — | — | 26° C. | 1.0% | 100 ppm |
| 28 | 5.59 | 2.20 | 10.5 g/l | 12.6 g/l | 3.0 g/l | 28° C. | 400 ppm | 100 ppm |
| 31 | 5.47 | 2.35 | 13.8 g/l | 10.5 g/l | 3.6 g/l | 28° C. | 300 ppm | 100 ppm |
| 37* | 6.07 | 4.21 | 26.2 g/l | 9.6 g/l | 3.8 g/l | 48° C. | 50 ppm | 160 ppm |
| 38* | 6.07 | 4.21 | 22.0 g/l | 4.4 g/l | 1.5 g/l | 27° C. | 58 ppm | 40 ppm |

*pickle acid baths about 50% spent

The fluorine to titanium mole ratio of the spent pickle acid was adjusted to the value shown under column (F/Ti)(M) by adding 70% HF. The potassium to titanium mole ratio of the spent pickle acid was adjusted to the value shown under column (K/Ti)(M) by adding aqueous potassium chloride.

Table II illustrate that (a) the aluminum and calcium impurity content of the product $K_2TiF_6$ is very sensitive to the adjusted F/Ti mole ratio, (b) the higher the K/Ti mole ratio, the less titanium that remains behind in the processed pickle acid liquor, and (c) more titanium remains with the processed pickle acid liquor at higher crystallization temperatures.

EXAMPLE 3

Several other lab tests were run similar to Example 2, except that the KCl was added as dry crystals rather than as a solution in an amount to achieve in 18 gpl K concentration in the resulting solution. In each case, 50 grams of speed crystal were added to prior to adding the KCl. The fluoride to titanium ratio was varied and the $K_2TiF_6$ crystals were filtered and washed. The wet crystals were then divided into two samples, one being immediately dried and screened and the other being rewetted with water to obtain surface moisture, aged for 16 or more hours, rewashed and filtered, dried and screened. The results are shown in Table III.

TABLE III

| | Run 9 | | Run 13 | | Run 15 | |
|---|---|---|---|---|---|---|
| | Unaged | Aged | Unaged | Aged | Unaged | Aged |
| Adjusted (F/Ti)M | 6.77 | | 6.52 | | 6.75 | |
| cumulative screen analysis % by weight | | | | | | |
| +60 mesh | 1.09% | 5.48% | .50% | 8.06% | 0.00% | 0.30% |
| +100 mesh | 47.21% | 56.67% | 18.69% | 41.29% | 1.16% | 40.40% |
| +200 mesh | 80.29% | 85.30% | 31.09% | 67.90% | 19.94% | 87.60% |
| +325 mesh | 90.66% | 93.37% | 53.77% | 87.17% | 60.19% | 96.90% |
| −325 mesh | 100.00% | 100.00% | 100.00% | 100.00% | 100.00% | 100.00% |
| medium particle size-microns | 145 | 173 | 50 | 125 | 52 | 137 |

| | Run 20 | | Run 21 | | Run 33 | |
|---|---|---|---|---|---|---|
| | Unaged | Aged | Unaged | Aged | Unaged | Aged |
| Adjusted (F/Ti)M | 6.50 | | 6.25 | | 6.50 | |
| cumulative screen analysis % by weight | | | | | | |
| +60 mesh | 1.23% | 1.55% | 0.41% | 23.14% | 10.41% | 9.80% |
| +100 mesh | 30.99% | 45.30% | 6.65% | 68.42% | 48.74% | 52.81% |
| +200 mesh | 59.79% | 73.99% | 22.21% | 89.36% | 82.13% | 85.80% |
| +325 mesh | 71.62% | 84.12% | 49.68% | 95.48% | 93.38% | 95.24% |
| −325 mesh | 100.00% | 100.00% | 100.00% | 100.00% | 100.00% | 100.00% |
| median particle size-microns | 100 | 137 | 45 | 187 | 142 | 170 |

Table III illustrates the growth in size of the crystals when aged in contact with water.

What is claimed is:

1. A process for recovering a substantially pure alkali metal fluorotitanate salt containing at least 19.5% titanium of controlled particle size of from 60 to 325 mesh from tetravalent titanium containing spent pickle acid liquors containing titanium alloying metals by first making small sized crytals which are converted to larger size product crystals which comprises the steps of:
    (a) adding fluorine ion to tetravalent titanium-containing spent pickle acid liquor containing titanium alloying metals to adjust the fluorine to titanium mole ratio in said liquor to a value of about 5.5 to about 6.2 to obtain a prepared titanium containing spent pickle acid liquor;
    (b) adjusting the temperature of the prepared titanium containing spent pickle acid liquor to between about 22° C. and 28° C.;
    (c) adding, with agitation, an excess of alkali metal salt to the prepared titanium-containing spent pickle acid liquor to produce an alkali metal fluorotitanate product salt containing at least 19.5% titanium.

(d) filtering the resulting alkali metal fluorotitanate product salt from the solution of step (c);

(e) adding the alkali metal fluorotitanate salt to an aging solution of water or weak hydrofluoric acid and aging the salt in the solution longer than 20 minutes to reduce the impurities in the salt and refine the particle size of the salt to a particle size of from about 60 mesh to about 325 mesh;

(f) filtering the aged alkali metal fluorotitanate salt from the aging solution; and (g) drying the filtered, aged alkali metal fluorotitanate salt.

2. The process according to claim 1 wherein nitric acid is added to the spent pickle acid liquors before the addition of fluoride ion to oxidize any trivalent titanium present in the pickle acid liquors to tetravalent titanium.

3. The process according to claim 1 wherein the fluorine to titanium mole ratio is adjusted to a value of from 5.9 to less than 6.2.

4. The process according to claim 1 wherein the aging liquor is weak hydrofluoric acid from 0.05 to 1.0 N.

5. The process according to claim 1 wherein the alkali metal salt is added as a solid to the prepared titanium-containing spent pickle acid liquor.

6. The process according to claim 1 wherein the alkali metal salt is dissoved in liquid prior to addition to the prepared titanium containing spent pickle acid liquor.

7. The process according to claim 6 wherein the alkali metal salt solution is dissolved in water prior to addition to the prepared titanium-containing spent pickle acid liquor.

8. The process according to claim 6 in which alkali metal carbonates, alkali metal bicarbonates, alkali metal hydroxides are dissolved and neutralized in acid solutions prior to addition to the prepared titanium containing spent pickle acid liquor.

9. The process according to claim 8 in which the acid solution is recycled spent mother liquor from the filtration step (d).

10. The process according to claim 1 wherein the alkali metal salt is selected from the group consisting of alkali metal carbonate, alkali metal bicarbonate, alkali metal bifluoride, alkali metal hydroxide, alkali metal oxide, alkali metal nitrate, alkali metal chloride, and alkali metal sulfate.

11. The process according to claim 1 wherein the fluoride to titanium mole ratio is adjusted with hydrochloric acid.

12. The process according to claim 10 wherein the alkali metal salt is a potassium salt.

13. The process according to claim 12 wherein the alkali metal salt is potassium chloride.

14. The process according to claim 1 wherein the titanium-containing spent pickle acid solution is neutralized with a base after removal of the alkali metal fluorotitanate by filtration.

15. The process according to claim 14 wherein the base is lime, sodium hydroxide, or potassium hydroxide, magnesium oxide hydroxide, or dolmitic lime.

16. The process according to claim 15 wherein the base is lime.

17. The process according to claim 1 wherein sufficient alkali metal salt is added to the prepared titanium-containing spent pickle acid liquor to adjust the mole ratio of alkali metal salt to titanium to greater than 2.

18. The process according to claim 17 wherein the mole ratio of alkali metal to titanium is adjusted to between about 2.1 and 2.73.

19. The process according to claim 1 wherein the alkali metal salt is a potassium salt and the prepared titanium-containing spent pickle acid, following addition of the potassium salt, is mildly agitated for at least one hour at a temperature between 26° C. and 28° C. to form the potassium titanium fluoride product salt crystals.

20. A process for recovering a substantially pure alkali metal fluorotitanate salt containing at least 19.5% titanium of particle size of from 60 to 325 mesh from tetravalent titanium containing spent pickle acid liquor containing aluminum and/or calcium which comprises the steps of:

(a) adding fluoride ion to tetravalent titanium containing spent pickle acid liquor containing aluminum and/or calcium to adjust the fluorine to titanium mole ration in said liquor to a value of about 5.5 to about 6.2 to obtain a prepared titanium containing spent pickle acid liquor;

(b) adjusting the temperature of the prepared titanium containing spent pickle acid liquor to between about 22° C. and about 28° C;

(c) adding, with agitation, an excess of alkali metal salt to the prepared titanium containing spent pickle acid to produce an alkali metal fluorotitanate product salt containing at least 19.5% titanium and having a predominate particle size of less than 325 mesh;

(d) filtering the resulting alkali metal fluorotitanate product salt from the solution of step (c); and (e) drying the alkali metal fluorotitanate product salt.

21. The process according to claim 20 wherein an oxidant is added to the spent pickle acid liquor to oxidize trivalent titanium to tetravalent titanium.

22. The process according to claim 20 wherein the fluorine to titanium mole ratio is adjusted to a value of from 5.9 to less than 6.2 to maximize yields for this approach.

23. The process according to claim 20 wherein the alkali metal salt is added as a solid to the prepared titanium containing spent pickle acid liquor.

24. The process according to claim 24 wherein the alkali metal salt is dissolved in liquid prior to addition to the prepared titanium containing spent pickle acid liquor.

25. The process according to claim 24 wherein the alkali metal salt solution is dissolved in water prior to addition to the prepared titanium containing spent pickle acid liquor.

26. The process according to claim 24 in which alkali metal carbonates, alkali metal bicarbonates, alkali metal hydroxides are dissolved in acid solutions prior to addition to the prepared titanium containing spent pickle acid liquor.

27. The process according to claim 26 in which acid solution is recycled spent mother liquor from the filtration step (d).

28. The process according to claim 20 wherein the alkali metal salt is selected from the group consisting of alkali metal carbonate, alkali metal bicarbonate, alkali metal hydroxide, alkali metal oxide, alkali metal nitrate, alkali metal chloride and alkali metal sulfate.

29. The process according to claim 20 wherein the fluoride to titanium mole ratio is adjusted with hydrofluoric acid.

30. The process according to claim 28 wherein the alkali metal salt is a potassium salt.

31. The process according to claim 30 wherein the alkali metal salt is potassium chloride.

32. The process according to claim 20 wherein the titanium containing spent pickle acid solution is neutralized with a base after removal of the alkali metal fluorotitanate by filtration.

33. The process according to claim 32 wherein the base is lime, sodium hydroxide, potassium hydroxide, magnesium oxide hydroxide, or dolmitic lime.

34. The process according to claim 33 wherein the base is lime.

35. The process according to claim 20 wherein sufficient alkali metal salt is added to the prepared titanium containing spent pickle acid liquor to adjust the mole ratio of alkali metal salt to titanium to greater than 2.

36. The process according to claim 35 wherein the mole ratio of alkali metal to titanium is adjusted to between about 2.1 and 2.73.

37. The process according to claim 20 wherein the alkali metal salt is a potassium salt and the prepared titanium containing spent pickle acid, following the addition of the potassium salt, is mildly agitated for at least one hour at a temperature between 26° C. and 28° C. to form the potassium titanium fluoride product salt crystals.

38. The process according to claim 21 wherein the oxidant is nitric acid.

39. A process for recovering a relatively pure alkali metal fluorotitanate containing at least 95% titanium from tetravalent titanium containing spent pickle acid liquor containing titanium alloying metals by forming large particle size alkali metal fluorotitanate crystals in the crystallization step which comprises the steps of:
(a) adding fluoride ion to tetravalent titanium containing spent pickle acid liquor containing titanium alloying metals to adjust the fluorine to titanium mole ratio in said liquor to a value of from about 6.3 to about 6.9 to obtain a prepared titanium containing spent pickle acid;s
(b) adjusting the temperature of the prepared titanium containing spent pickle acid to between about 22° C. and about 28° C.;
(c) adding, with agitation, an excess of alkali metal salt to the prepared titanium containing spent pickle acid to produce an alkali metal fluorotitanate containing at least 19.5% titanium and having a particle size of from about 60 to about 325 mesh;
(d) filtering the resulting alkali metal fluorotitanate product salt from the solution of step (c); and
(e) drying the alkali metal fluorotitanate salt.

40. The process according to claim 39 wherein an oxidant is added to the spent pickle acid liquor before the addition of fluoride ion to oxidize tetravalent titanium to tetravalent titanium.

41. The process according to claim 39 wherein the alkali metal salt is added as a solid to the prepared titanium containing spent pickle acid liquor.

42. The process according to claim 39 wherein the alkali metal salt is dissolved in liquid prior to addition to the prepared titanium containing spent pickle acid liquor.

43. The process according to claim 42 wherein the alkali metal salt solution is dissolved in water prior to addition to the prepared titanium containing spent pickle acid liquor.

44. The process according to claim 42 in which alkali metal carbonates, alkali metal bicarbonates and alkali metal hydroxides are dissolved in acid solutions prior to addition to the prepared titanium containing spent pickle acid liquor.

45. The process according to claim 44 in which the acid solution is recycled spent mother liquor from the filtration step (d).

46. The process according to claim 39 wherein the alkali metal salt is selected from the group consisting of alkali metal carbonate, alkali metal bicarbonate, alkali metal bifluoride, alkali metal hydroxide, alkali metal oxide, alkali metal nitrate, alkali metal chloride , and alkali metal sulfate.

47. The process according to claim 39 wherein the fluoride to titanium mole ratio is adjusted with hydrochloric acid.

48. The process according to claim 46 wherein the alkali metal salt is a potassium salt.

49. The process according to claim 48 wherein the alkali metal salt is potassium chloride.

50. The process according to claim 39 wherein the titanium containing spent pickle acid solution is neutralized with a base after removal of the alkali metal fluorotitanate by filtration.

51. The process according to claim 50 wherein the base is lime, sodium hydroxide, potassium hydroxide, magnesium oxide hydroxide, or dolmitic lime.

52. The process according to claim 51 wherein the base is lime.

53. The process according to claim 39 wherein sufficient alkali metal salt is added to the prepared titnaium containing spent pickle acid liquor to adjust the mole ratio of alkali metal salt to titanium to greater than 2.

54. The process according to claim 53 wherein the mole ratio of alkali metal to titanium is adjusted to between about 2.1 and 2.73.

55. The process according to claim 39 wherein the alkali metal salt is potassium salt and the prepared titanium containing spent pickle acid, following addition of the potassium salt, is mildly agitated for at least one hour at a temperature between 26° C. and 28° C. to form the potassium titanium fluoride product salt crystals.

56. The process according to claim 39 wherein the fluorine to titanium mole ratio is adjusted by adding an amount of 70 weight percent hydrofluoric acid to the titanium-containing spent pickle acid equivalent to the amount set forth in the following formula:

$$70\%HF\ (lbs) = G([Ti]) \times 0.0319 - [F] \times 0.01255)$$

wherein G is the gallons of titanium-containing spent pickle acid liquor, [Ti] is the titanium concentration in grams per liter in the titanium-containing spent pickle acid liquor, and [F] is the fluoride concentration in grams per liter in the titanium-containing spent pickle acid.

57. The processing according to claim 39 wherein an amount of granular potassium chloride is added to the prepared titanium-containing spent pickle acid equivalent to the amount set forth in the following formula:

$$KCl\ (lbs) = G([Ti] \times 0.0236 + 0.2895)$$

wherein KCl is the lbs. of KCL added, G is the gallons of prepared titanium-containing spent pickle acid liquor, and [Ti] is the titanium concentration in grams per liter in the prepared titanium-containing spent pickle acid.

58. The process according to claim 39 in which the alkali metal fluorotitanate product salt from step (d) is aged with water for a period of longer than 20 minutes.

59. The process according to claim 40 wherein the oxidant is nitric acid.

* * * * *